United States Patent
Li et al.

(10) Patent No.: US 7,039,262 B2
(45) Date of Patent: May 2, 2006

(54) DEPOLARIZER

(75) Inventors: Wei-Zhong Li, San Jose, CA (US); Qingdong Guo, Sunnyvale, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 10/986,713

(22) Filed: Nov. 12, 2004

(65) Prior Publication Data
US 2005/0094919 A1  May 5, 2005

Related U.S. Application Data

(63) Continuation of application No. 10/119,570, filed on Apr. 9, 2002, now Pat. No. 6,819,810.

(51) Int. Cl.
*G02B 6/27* (2006.01)
*G02B 27/28* (2006.01)

(52) U.S. Cl. .............................. 385/11; 385/33; 385/47; 359/495; 359/497

(58) Field of Classification Search ........ 359/483–485, 359/494–497; 385/11, 39, 47
See application file for complete search history.

(56) References Cited

U.S. PATENT DOCUMENTS

| | | | | |
|---|---|---|---|---|
| 5,546,219 A | * | 8/1996 | Iida | 359/484 |
| 5,933,555 A | * | 8/1999 | Shen | 385/11 |
| 6,574,015 B1 | * | 6/2003 | Tselikov et al. | 398/36 |
| 6,628,461 B1 | * | 9/2003 | Huang et al. | 359/494 |
| 6,765,670 B1 | * | 7/2004 | Olsson et al. | 356/327 |
| 6,813,397 B1 | * | 11/2004 | Lin | 385/11 |
| 2003/0053209 A1 | * | 3/2003 | Chang et al. | 359/484 |

* cited by examiner

*Primary Examiner*—Michelle Connelly-Cushwa
*Assistant Examiner*—Omar Rojas
(74) *Attorney, Agent, or Firm*—Fish & Richardson P.C.

(57) ABSTRACT

An optical depolarizer includes a birefringent block, a reflector coupled to the block, a first input port for providing polarized light to the block and an output port configured to receive polarized light from the block. The depolarizer optionally includes a non-reciprocal combination-device having a principal direction and including a first birefringent wedge, a second birefringent wedge, and a non-reciprocal rotating element. The non-reciprocal rotating element can be a Faraday rotator. The birefringent block can be optically coupled to the non-reciprocal combinatoin device. The optical depolarizer can include a lens that is optically coupled to the first wedge. The optical depolarizer can include a capillary for holding at least a PM optical fiber and an output optical fiber.

15 Claims, 10 Drawing Sheets

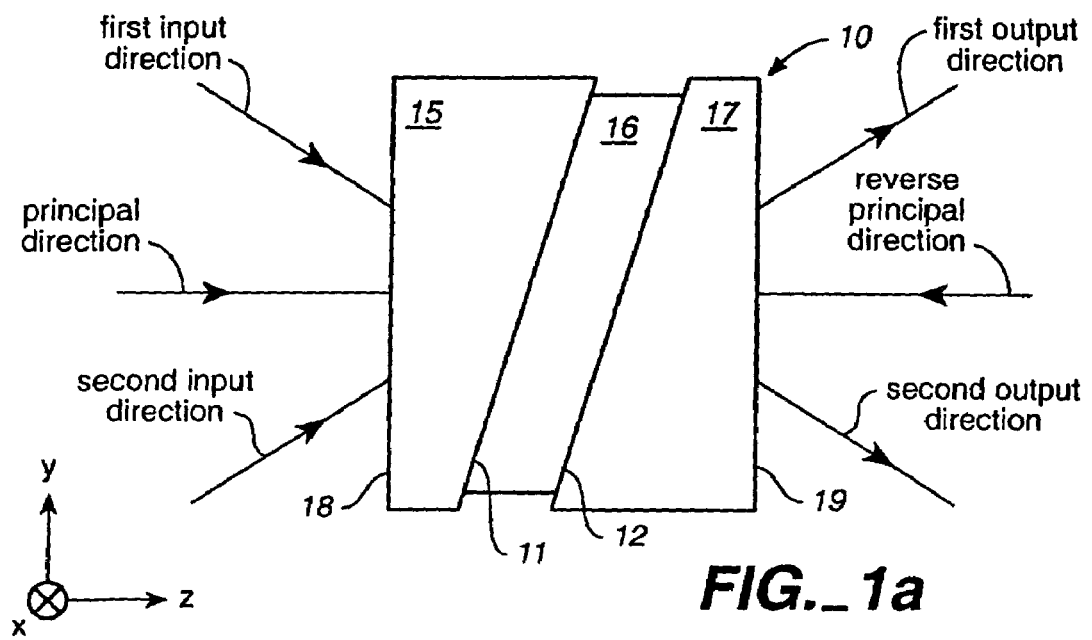
FIG._1a
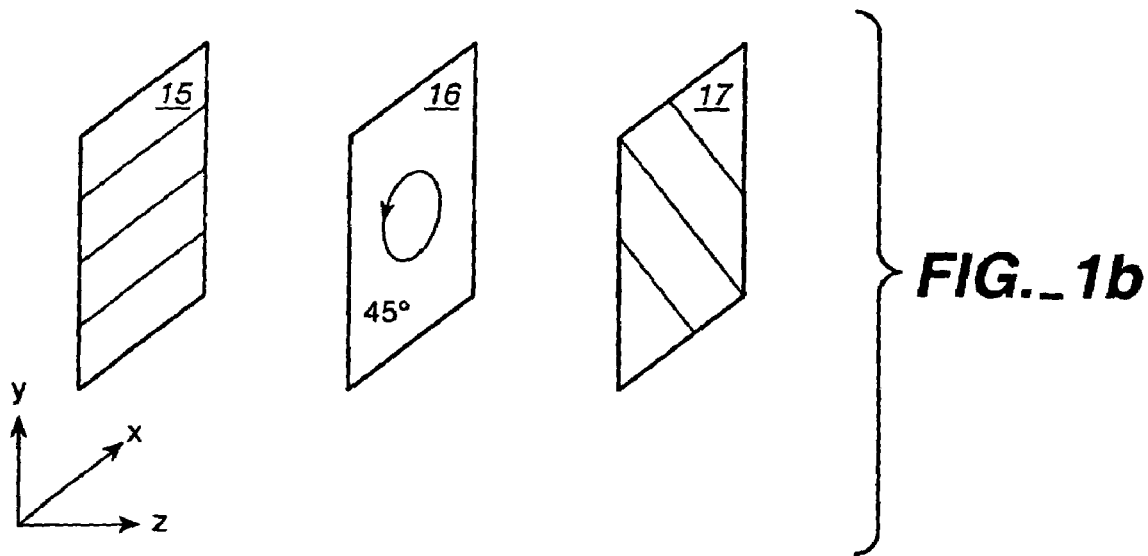
FIG._1b

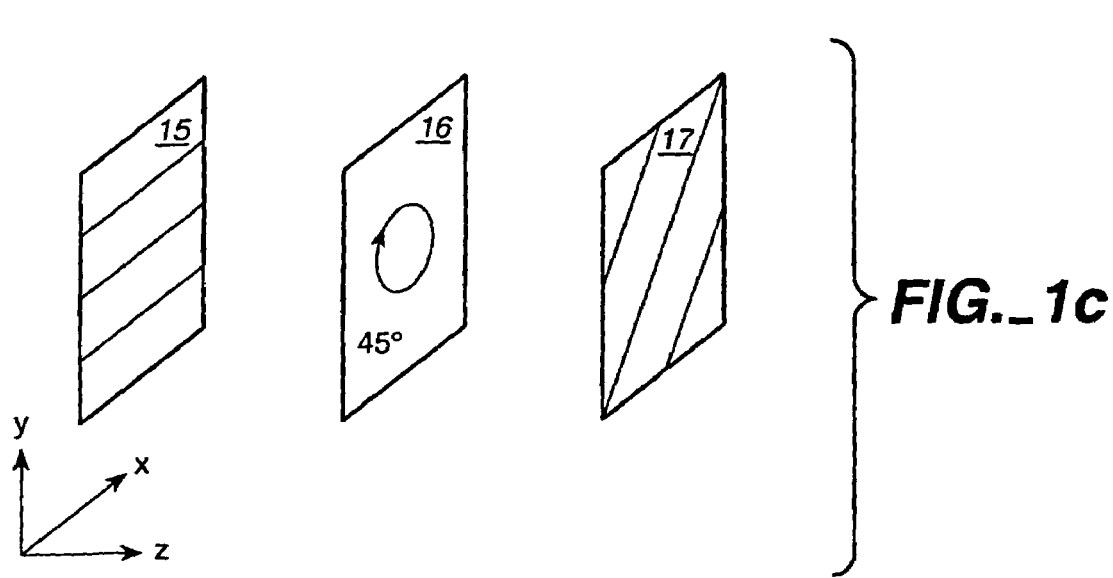
FIG._1c
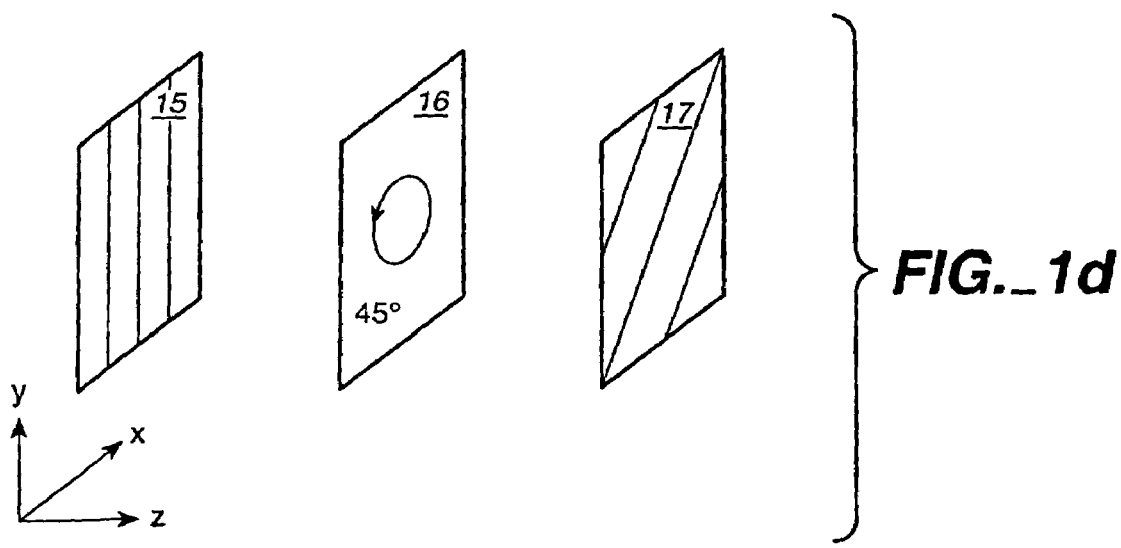
FIG._1d
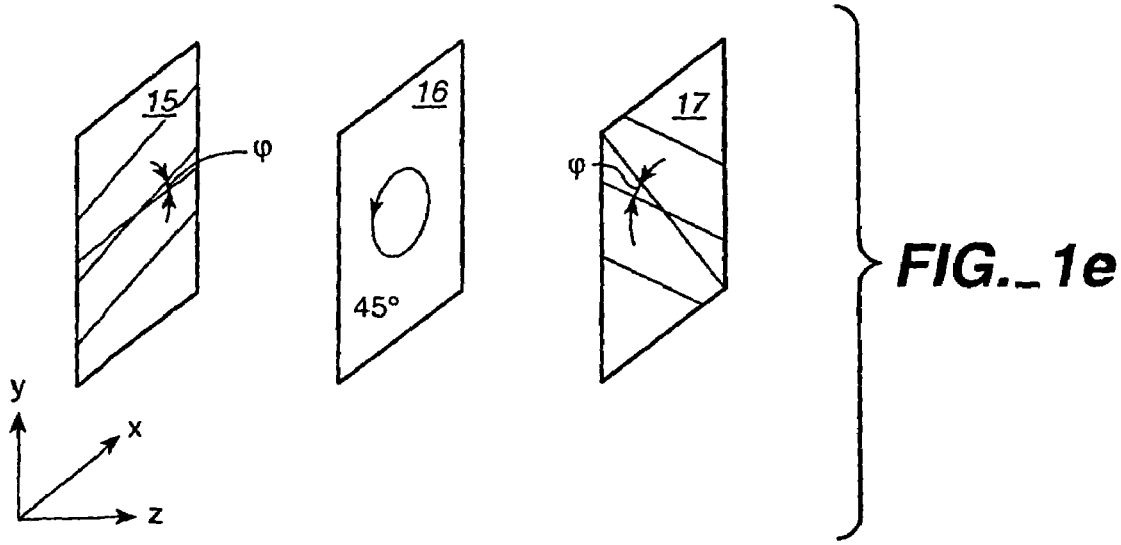
FIG._1e

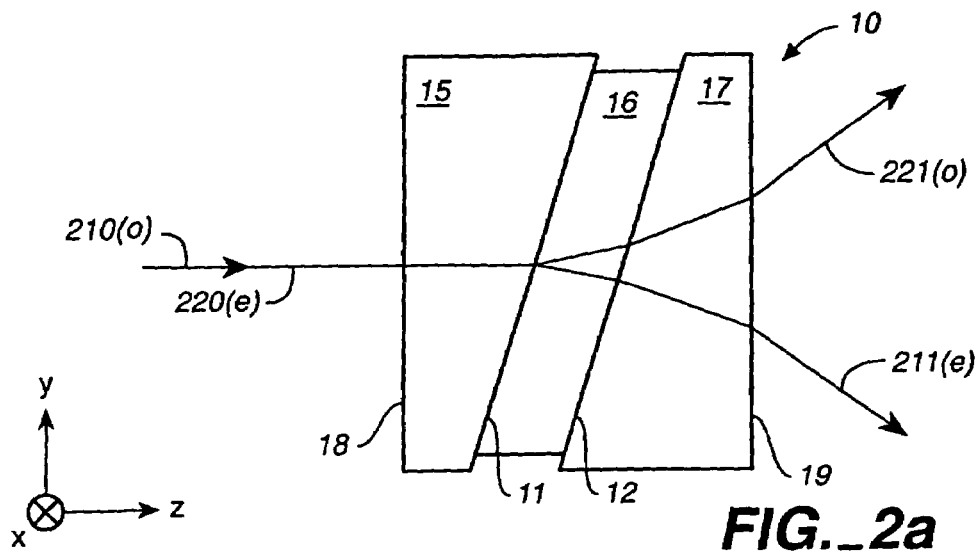
FIG._2a
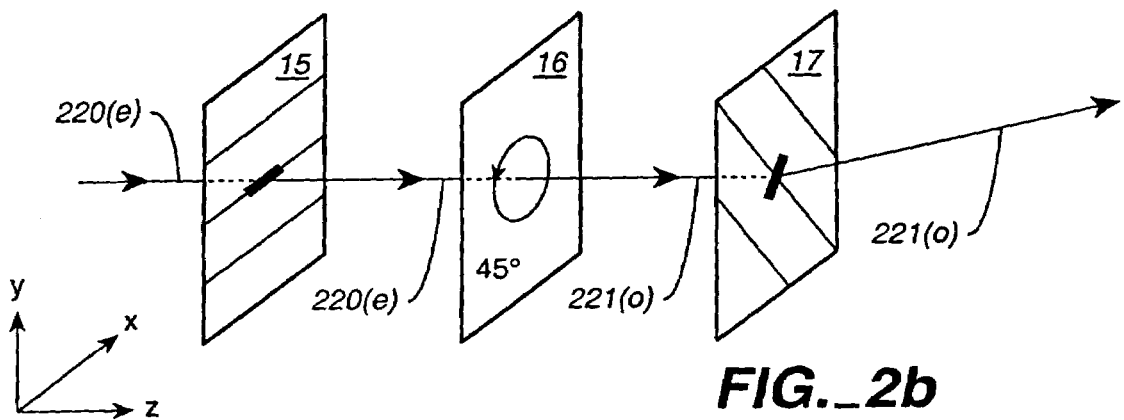
FIG._2b
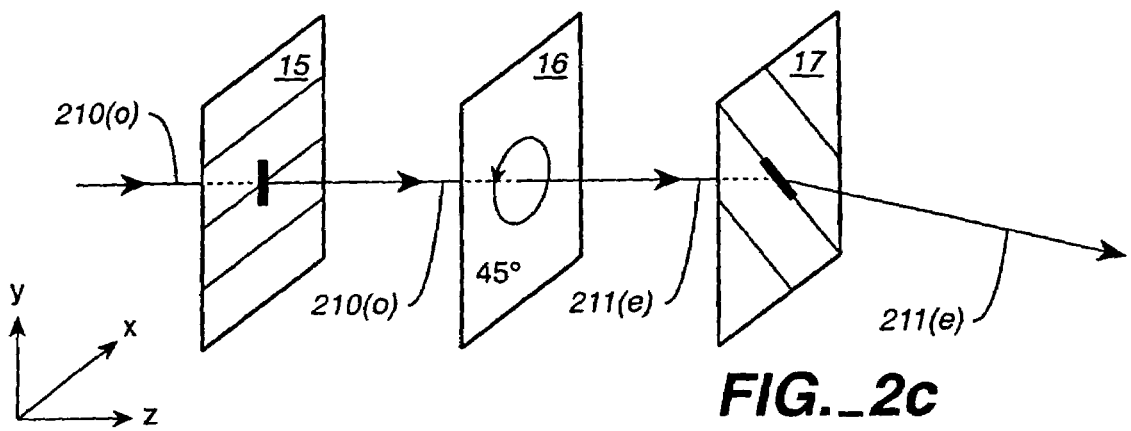
FIG._2c

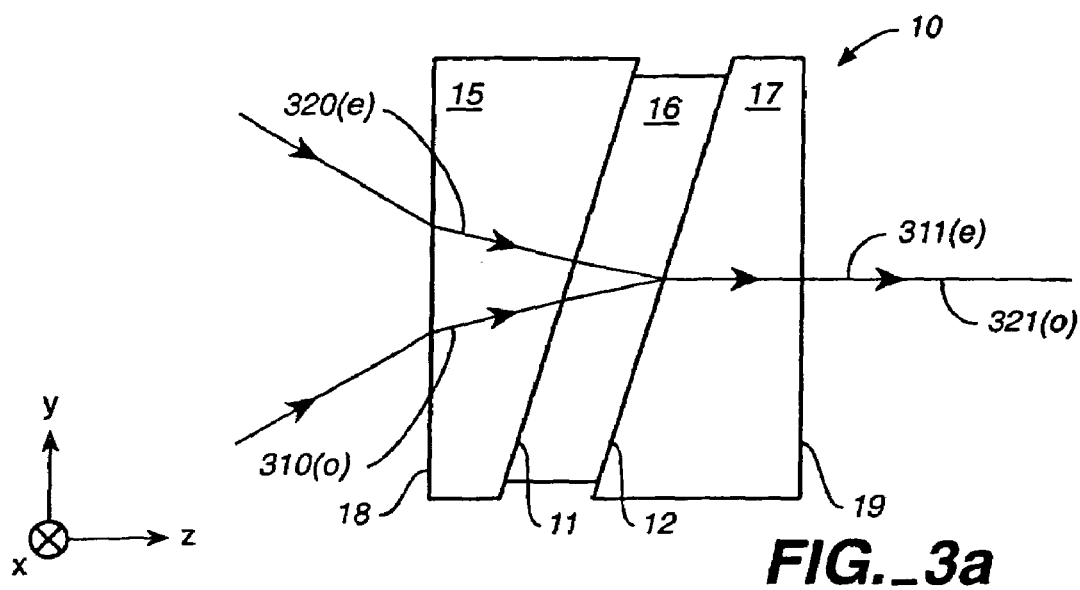
*FIG._3a*
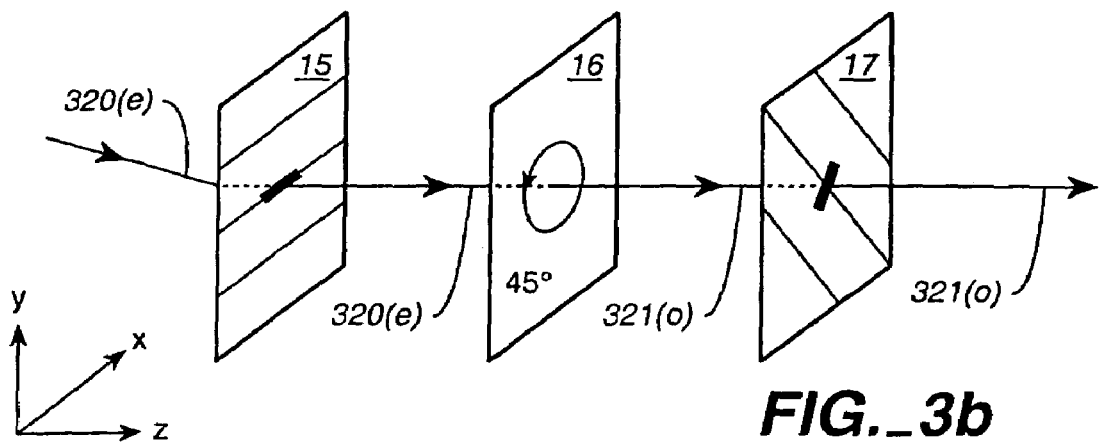
*FIG._3b*
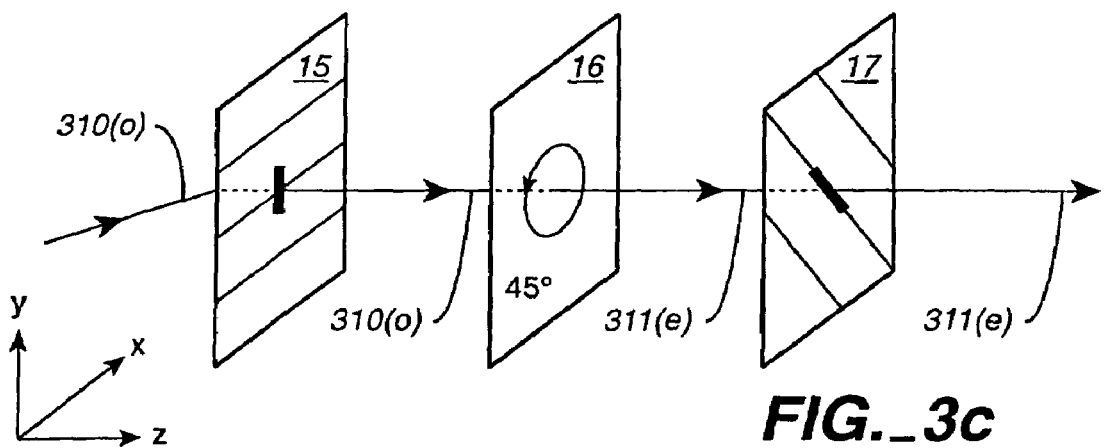
*FIG._3c*

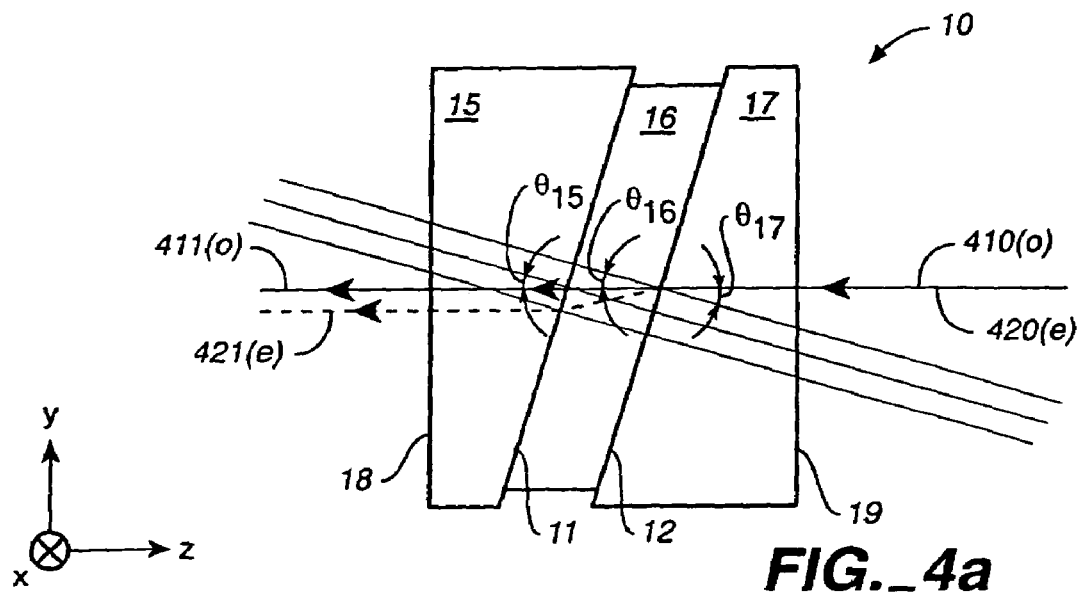
FIG._4a
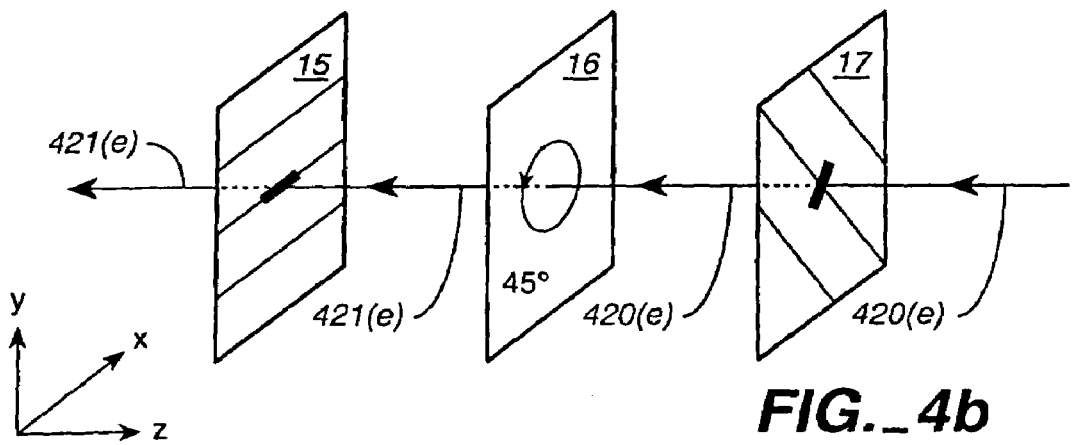
FIG._4b
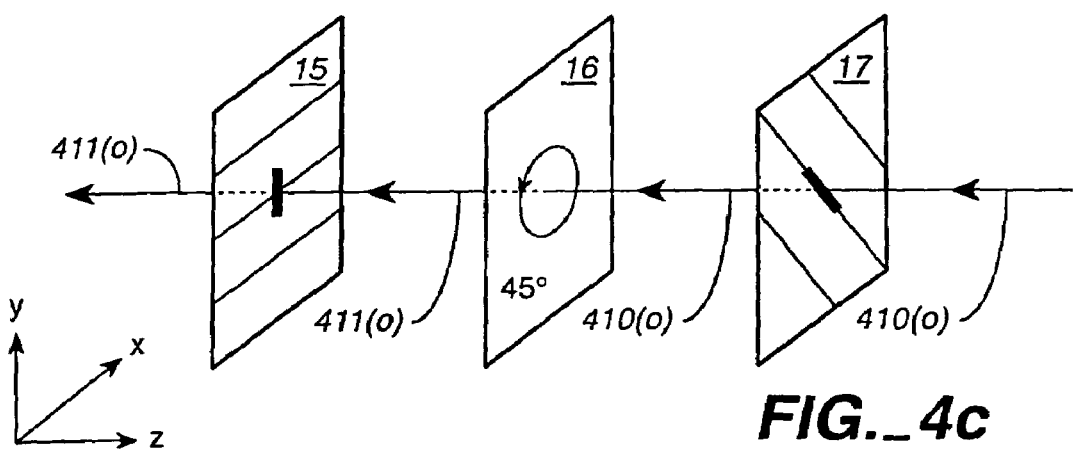
FIG._4c

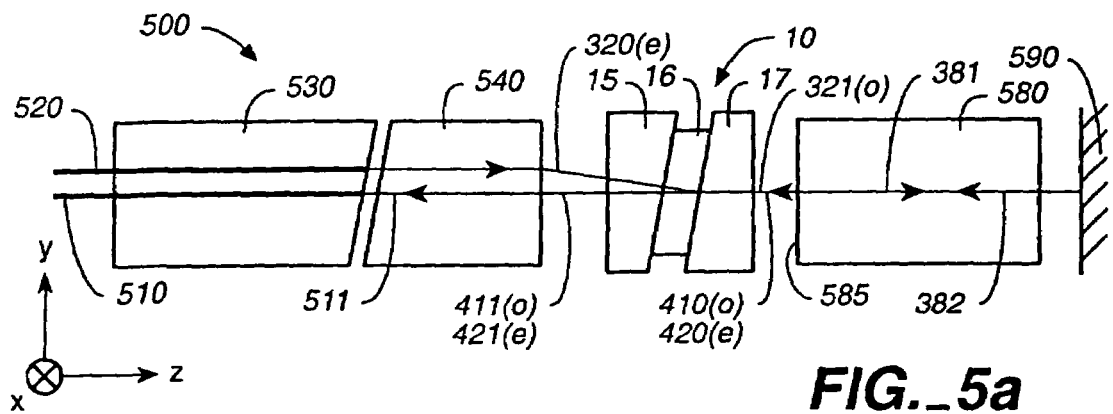
FIG._5a
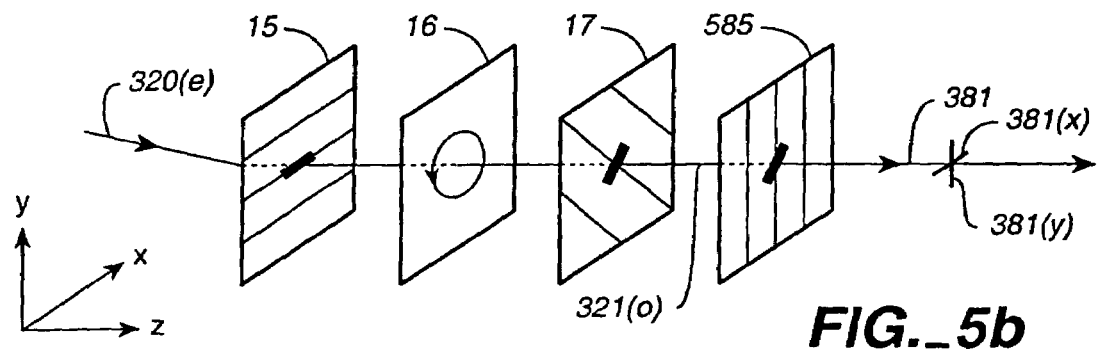
FIG._5b
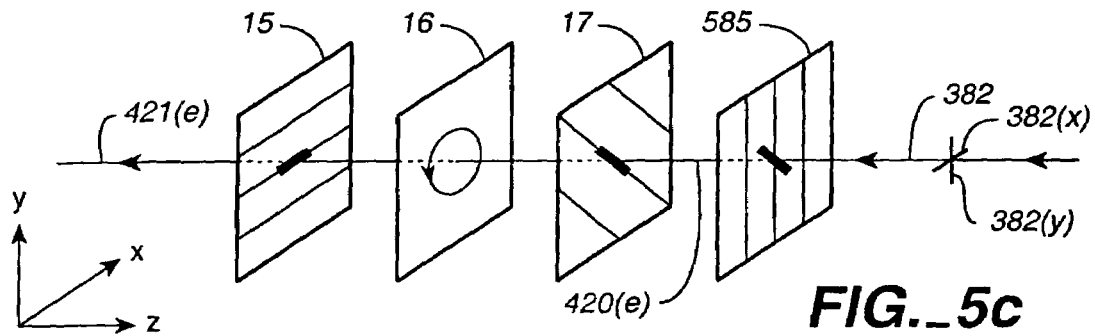
FIG._5c
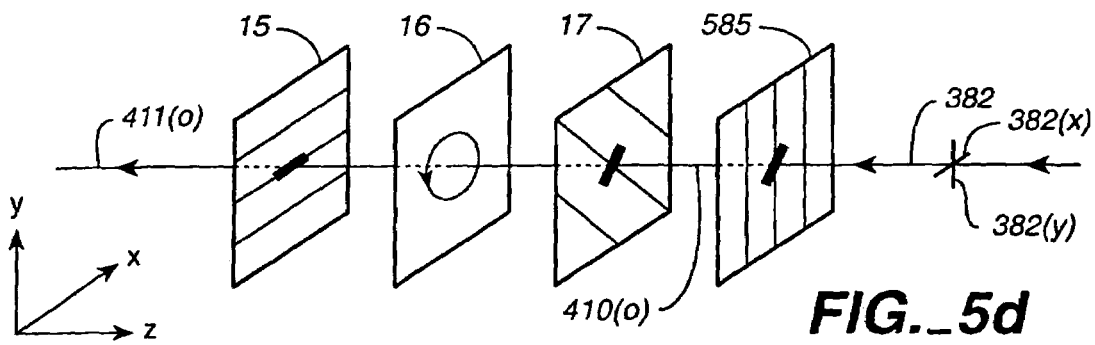
FIG._5d

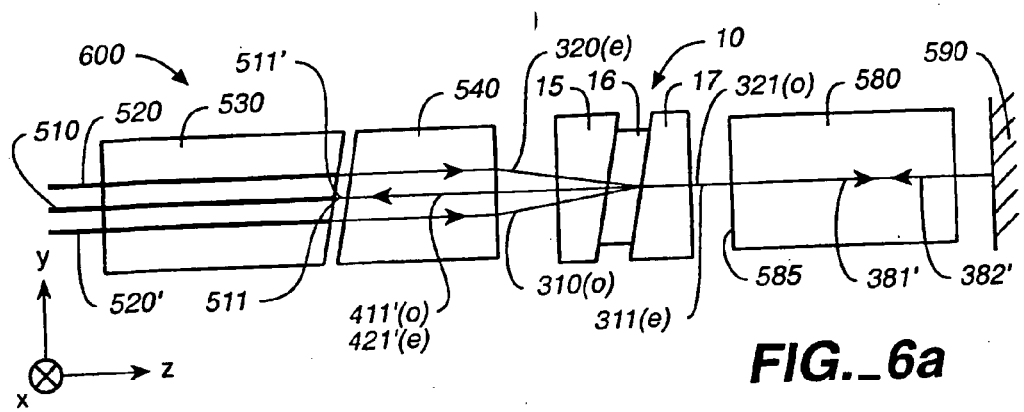
FIG._6a
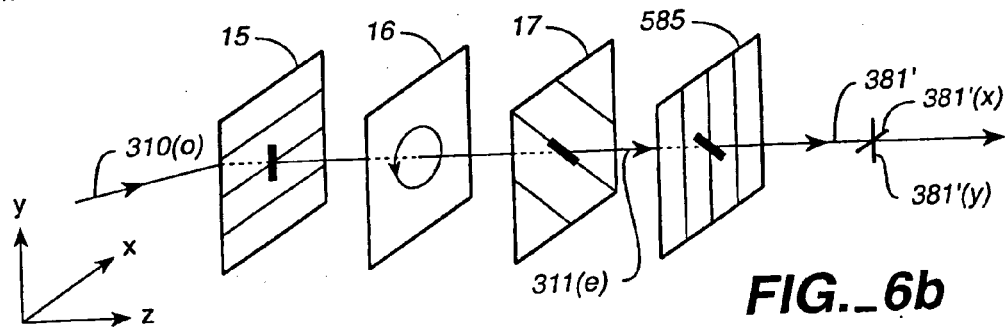
FIG._6b
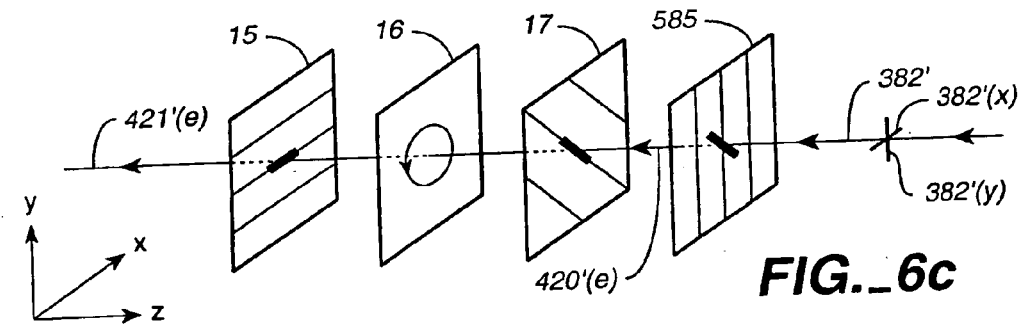
FIG._6c
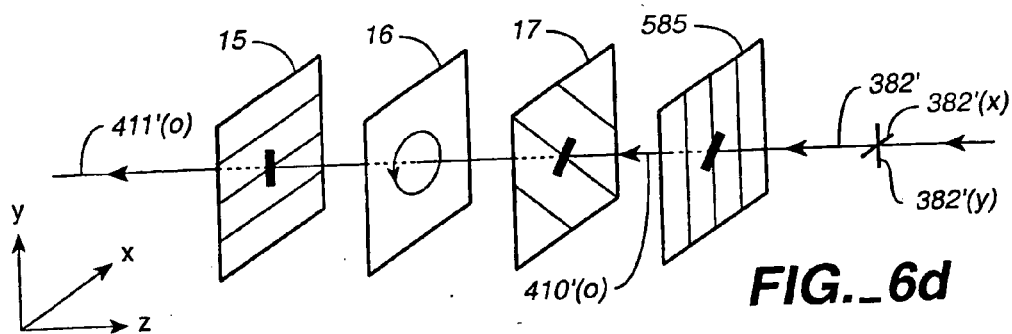
FIG._6d

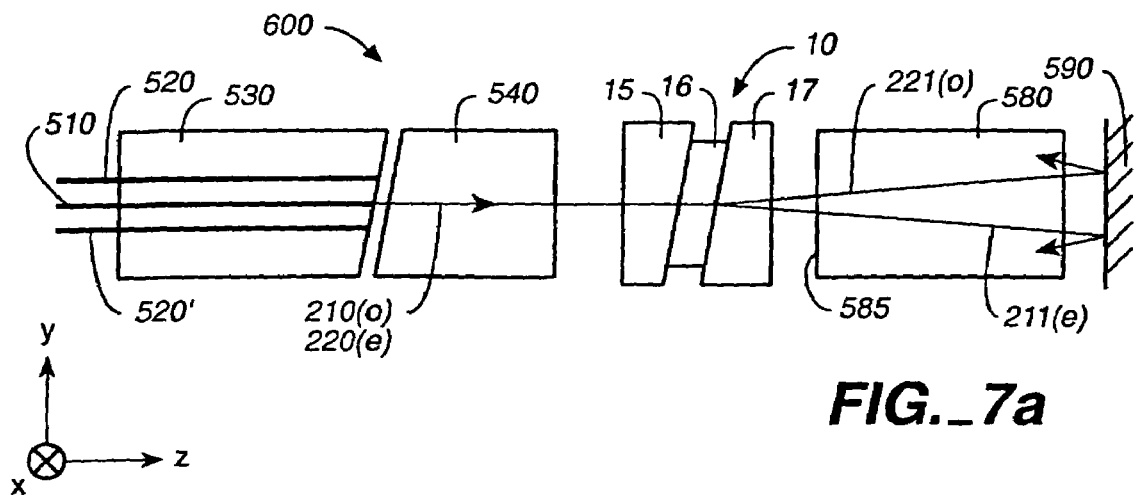
FIG._7a
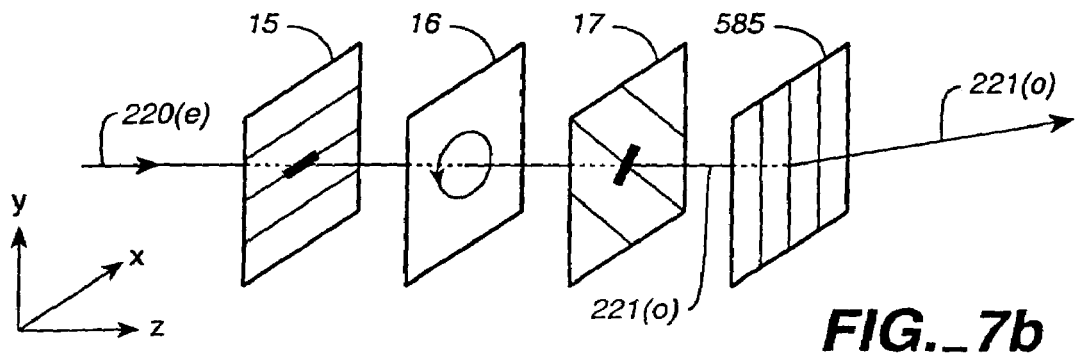
FIG._7b
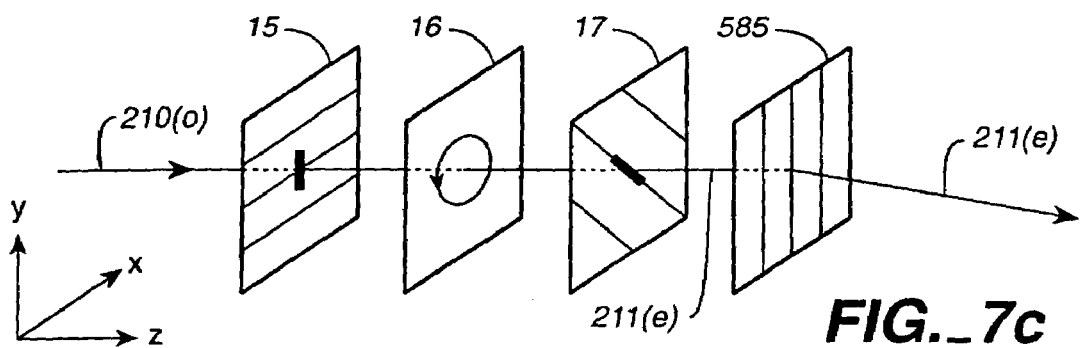
FIG._7c

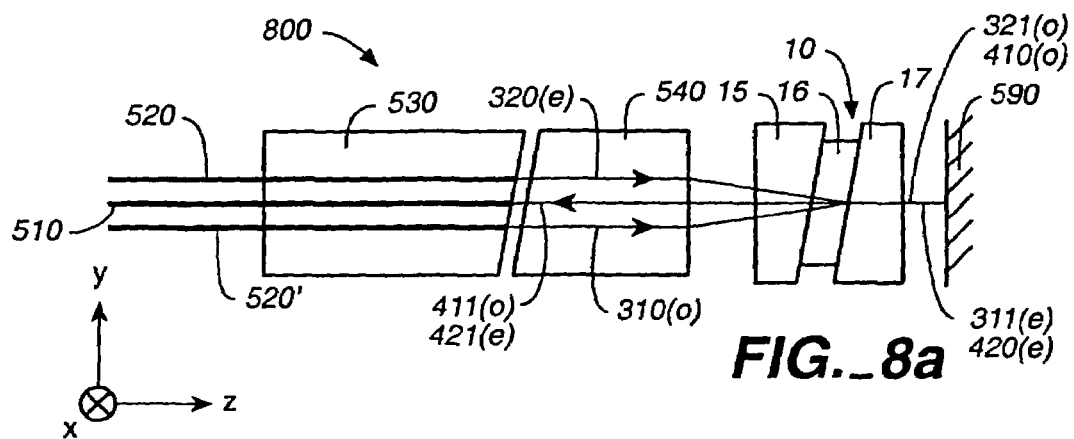
FIG._8a
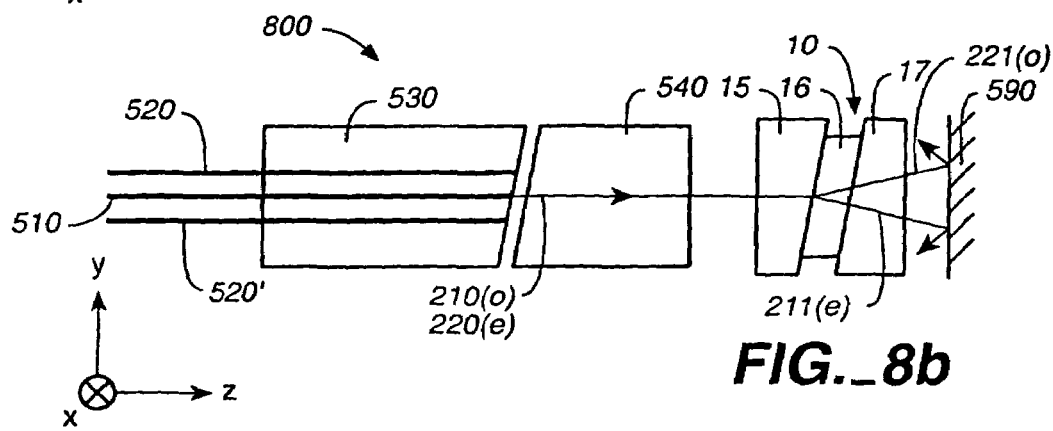
FIG._8b
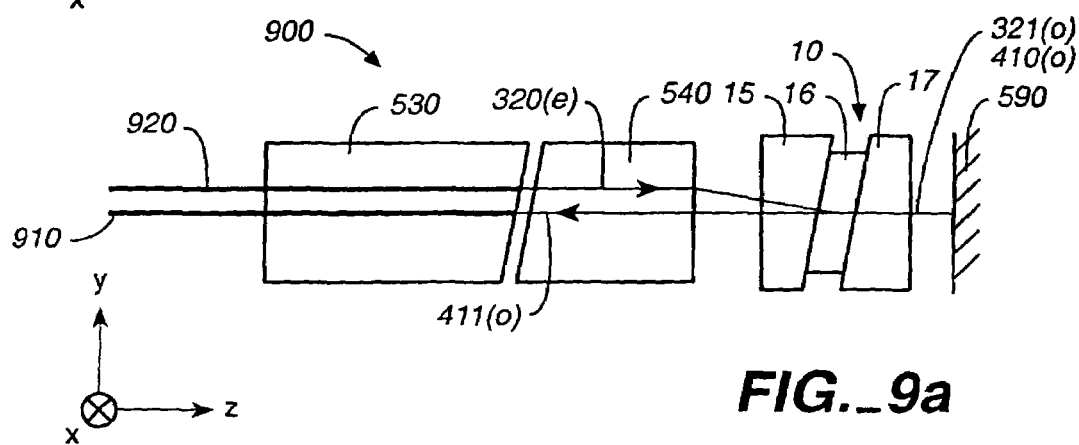
FIG._9a
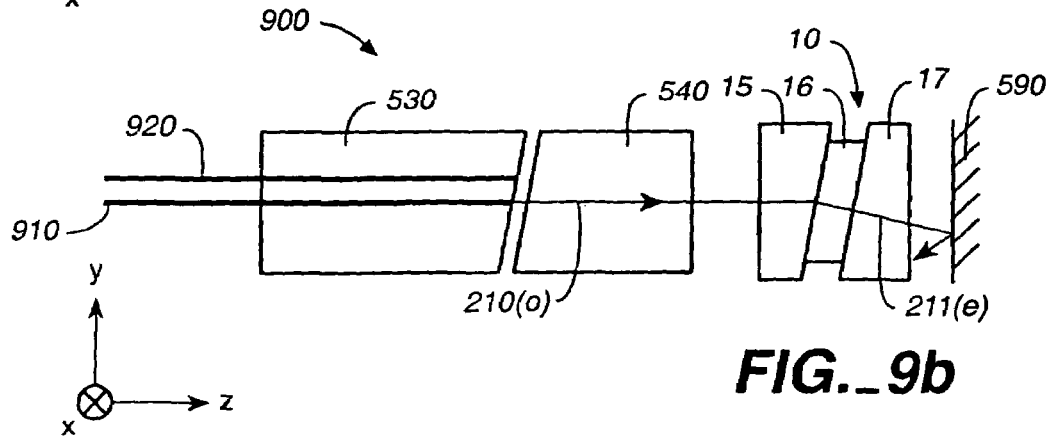
FIG._9b

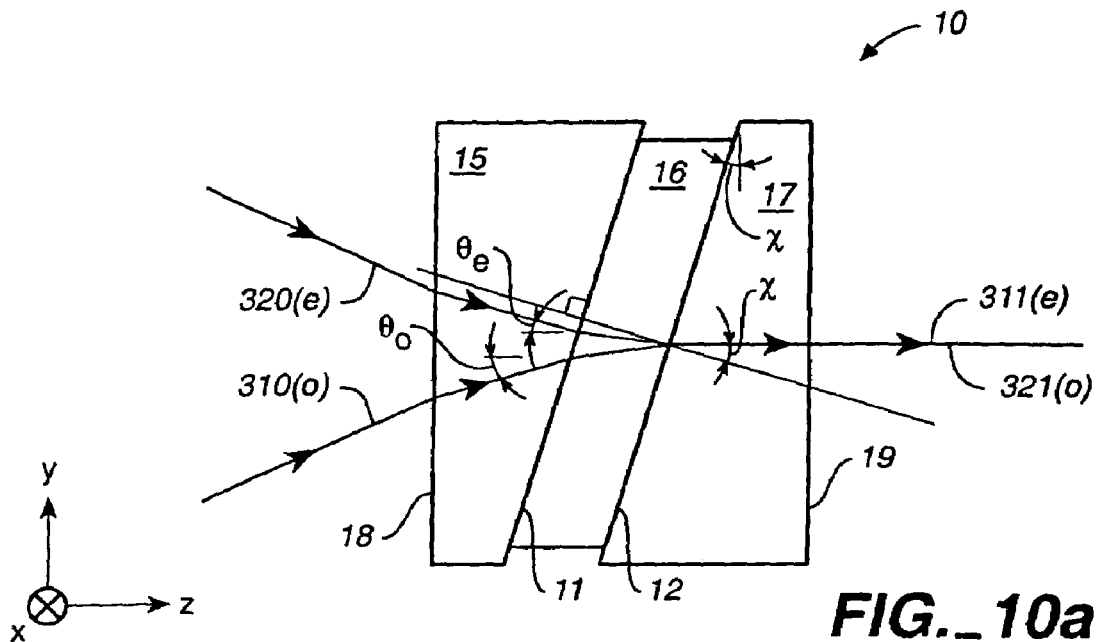
FIG._10a
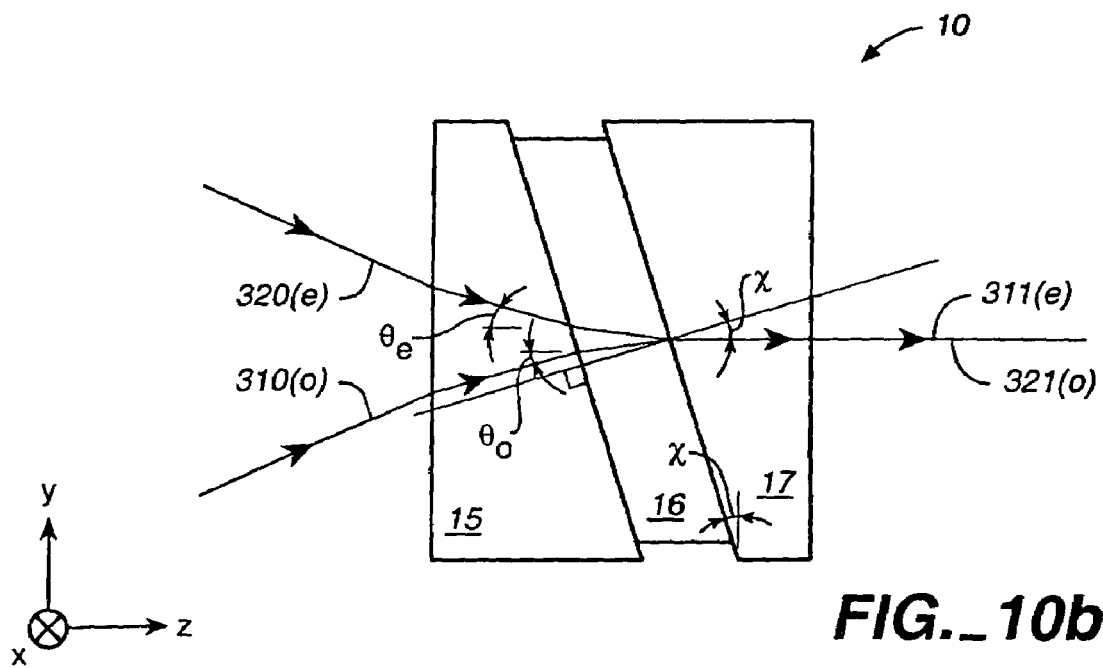
FIG._10b

DEPOLARIZER

CROSS-REFERENCE TO RELATED APPLICATIONS

This application is a continuation application of and claims priority to U.S. application Ser. No. 10/119,570, filed on Apr. 9, 2002 now U.S. Pat. No. 6,819,810.

The present invention relates generally to optical technology.

BACKGROUND OF THE INVENTION

Optical depolarizers, optical combiners, and optical isolators are commonly used in optical communication systems and optical measurement systems. An optical depolarizer is generally designed to change a beam of completely polarized light or a beam of partially polarized light into a beam of depolarized light. An optical combiner is a device generally designed to combine two beams of light into one beam of light. An optical isolator is a device generally designed to allow a beam of light to pass through the device in a chosen direction and to prevent the beam of light from passing through the device in the opposite of that chosen direction.

SUMMARY OF THE INVENTION

In one aspect, the invention provides an optical depolarizer. The optical depolarizer includes a birefringent block, a reflector coupled to the block, an input port for supplying polarized light to the block and an output port for receiving unpolarized light from the block. The reflector is located on one side of the block and the input and output ports are located on another side of the block.

In another aspect, the optical depolarizer includes a non-reciprocal combination-device, a birefringent block, and a reflector. The non-reciprocal combination-device has a principal direction and includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction, and the second optical axis forms a first angle with respect to the first optical axis. The non-reciprocal rotating element is optically coupled between the first and the second birefringent wedge. The non-reciprocal rotating element is designed to rotate the polarization of light passing through the non-reciprocal rotating element by a second angle. The non-reciprocal rotating element can be a Faraday rotator. The birefringent block is optically coupled to the second birefringent wedge. The birefringent block has a third optical axis perpendicular to the principal direction, and the third optical axis forms a third angle with respect to the second optical axis. The reflector is optically coupled to the birefringent block. The optical depolarizer can include a lens that is optically coupled to the first wedge. The optical depolarizer can include a capillary for holding at least a PM optical fiber and an output optical fiber.

In another aspect, the invention provides an optical depolarizer. The optical depolarizer includes a non-reciprocal combination-device, a birefringent block, and a reflector. The non-reciprocal combination-device has a principal direction and includes a first birefringent wedge having a first optical axis, a second birefringent wedge having a second optical axis, and a non-reciprocal rotating element. The non-reciprocal rotating element can be a Faraday rotator. The birefringent block is optically coupled to the second birefringent wedge. The birefringent block has a third optical axis perpendicular to the principal direction, and the third optical axis forms an angle with respect to the second optical axis. The reflector is optically coupled to the birefringent block. The optical depolarizer can include a lens that is optically coupled to the first wedge. The optical depolarizer can include a capillary for holding at least a PM optical fiber and an output optical fiber. The non-reciprocal combination-device is configured for enabling at least the following functions: (1) light entering the second birefringent wedge as an e-ray in a first input direction exits from the second birefringent wedge as an o-ray in the principal direction; (2) light entering the first birefringent wedge as an o-ray in a second input direction exits from the second birefringent wedge as an e-ray in the principal direction; (3) light entering the second birefringent wedge as an e-ray in a reverse principal direction exits from the first birefringent wedge as an e-ray in the reverse principal direction; and (4) light entering the second birefringent wedge as an o-ray in the reverse principal direction exits from the first birefringent wedge as an o-ray in the reverse principal direction.

In another aspect, the invention provides a method of combining first and second polarized light to form depolarized light in an output port. The method includes the step of providing a birefringent block and a non-reciprocal combination-device having a principal direction and a reverse principal direction. The method includes the step of directing the first polarized light to enter the non-reciprocal combination-device in a first input direction and to exit from the non-reciprocal combination-device in the principal direction as first intermediate light. The method includes the step of directing the second polarized light to enter the non-reciprocal combination-device in a second input direction and to exit from the non-reciprocal combination-device in the principal direction as second intermediate light. The method includes the step of passing the first and the second intermediate light through the birefringent block in the principal direction. The method includes the step of reflecting the first and the second intermediate light back through the birefringent block in the reverse principal direction. The method includes the step of directing the first and the second intermediate light to pass through the non-reciprocal combination-device in the reverse principal direction and enter the output port as depolarized light.

In another aspect, the invention provides a method of depolarizing a polarized light to form depolarized light in an output port. The method includes the step of providing a birefringent block and a non-reciprocal combination-device having a principal direction and a reverse principal direction. The method includes the step of directing the polarized light to enter the non-reciprocal combination-device in an input direction and to exit from the non-reciprocal combination-device in the principal direction as intermediate light. The method includes the step of passing the intermediate light through the birefringent block in the principal direction. The method includes the step of reflecting the intermediate light back through the birefringent block in the reverse principal direction. The method includes the step of directing the intermediate light to pass through the non-reciprocal combination-device in the reverse principal direction and enter the output port as depolarized light.

Aspects of the invention can include one or more of the following advantages. Implementations of the invention provide an optical depolarizer and an optical depolarizing combiner that may also function as an optical isolator. Implementations of the invention provides an optical depolarizer and an optical depolarizing combiner that may have small insertion loss, compact size, and reduced manufacturing cost. Other advantages will be readily apparent from the attached figures and the description below.

BRIEF DESCRIPTION OF THE DRAWINGS

FIG. 1a illustrates an implementation of a non-reciprocal combination-device.

FIG. 1b illustrates a specific configuration of birefringent wedges and a Faraday rotator of FIG. 1a.

FIGS. 1c–1e illustrate alternative configurations of the birefringent wedges and the Faraday rotator of FIG. 1a.

FIG. 2a illustrates the paths traveled by light that enters the non-reciprocal combination-device of FIG. 1a in the principal direction.

FIG. 2b illustrates that light entering the first birefringent wedge as an e-ray in the principal direction exits from the second birefringent wedge as an o-ray in the first output direction.

FIG. 2c illustrates that light entering the first birefringent wedge as an o-ray in the principal direction exits from the second birefringent wedge as an e-ray in the second output direction.

FIG. 3a illustrates the paths traveled by light that enters the non-reciprocal combination-device of FIG. 1a in the first and the second input direction.

FIG. 3b illustrates that light entering the second birefringent wedge as an e-ray in the first input direction exits from the second birefringent wedge as an o-ray in the principal direction.

FIG. 3c illustrates that light entering the first birefringent wedge as an o-ray in the second input direction exits from the second birefringent wedge as an e-ray in the principal direction.

FIG. 4a illustrates the paths traveled by the light that enters the non-reciprocal combination-device of FIG. 1a in the reverse principal direction.

FIG. 4b illustrates that light entering the second birefringent wedge as an e-ray in the reverse principal direction exits from the first birefringent wedge as an e-ray in the reverse principal direction.

FIG. 4c illustrates that light entering the second birefringent wedge as an o-ray in the reverse principal direction exits from the first birefringent wedge as an o-ray in the reverse principal direction.

FIGS. 5a–5d illustrate an implementation of an optical depolarizer 500.

FIGS. 6a–6d illustrate an implementation of an optical depolarizing combiner 600.

FIGS. 7a–7c shows that an optical depolarizing combiner 600 can also function as an optical isolator.

FIGS. 8a and 8b illustrate an implementation of an optical combiner 800.

FIGS. 9a and 9b illustrate an implementation of a PM isolator 900.

FIG. 10a illustrates an implementation of non-reciprocal combination-device 10 constructed using birefringent crystal materials with indexes $n_e$ larger than $n_o$.

FIG. 10b illustrates an implementation of non-reciprocal combination-device 10 constructed using birefringent crystal materials with indexes $n_e$ smaller than $n_o$.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals wherein may be applied to other embodiments. Thus, the present invention is not intended to be limited to the embodiments shown, but is to be accorded the widest scope consistent with the principals and features described herein.

The present invention will be described in terms of a non-reciprocal combination-device, an optical depolarizer, an optical depolarizing combiner, an optical combiner, and a Polarization Maintenance ("PM") isolator each having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

In the instant application, implementations of optical depolarizers, optical depolarizing combiners, optical combiners, and PM isolators using non-reciprocal combination-devices are described. The configuration and operation of the non-reciprocal combination device is described in greater detail below. The non-reciprocal combination-device generally includes two birefringent wedges and a non-reciprocal rotating element such as a Faraday rotator.

FIGS. 1a and 1b illustrate an implementation of a non-reciprocal combination-device 10 that includes a birefringent wedge 15, a birefringent wedge 17, and a non-reciprocal rotating element such as Faraday rotator 16. Birefringent wedges 15 and 17 are in the form of tapered plates. Surface 11 of birefringent wedge 15 faces surface 12 of birefringent wedge 17. In one implementation of non-reciprocal combination-device 10, surface 11 of birefringent wedge 15 substantially parallels surface 12 of birefringent wedge 17.

A coordinate system is illustrated including the x-direction, the y-direction and the z-direction. The optical axis of birefringent wedge 15 is in the x-direction. The optical axis of birefringent wedge 17 is in the x–y direction. Faraday rotator 16 is designed in such a way that, when light passes through the Faraday rotator 16 either in the positive or the negative z-direction, the polarization of the light will be rotated 45 degrees with respect to the positive z-axis. Non-reciprocal combination-device 10 has a principal direction that is in the positive z-direction. Non-reciprocal combination-device 10 also has a first input direction that is in the z−αy direction, a second input direction that is in the z+βy direction, a first output direction that is in the z+γy direction, and a second output direction that is in the z−δy direction. Where α, β, γ and δ are positive numbers.

In general, non-reciprocal combination-device 10, including a first and a second birefringent wedge, is constructed to perform one or more of the following six functions:

(1) light entering the first birefringent wedge as an e-ray in the principal direction exits from the second birefringent wedge as an o-ray in the first output direction;

(2) light entering the first birefringent wedge as an o-ray in the principal direction exits from the second birefringent wedge as an e-ray in the second output direction;

(3) light entering the first birefringent wedge as an e-ray in the first input direction exits from the second birefringent wedge as an o-ray in the principal direction;

(4) light entering the first birefringent wedge as an o-ray in the second input direction exits from the second birefringent wedge as an e-ray in the principal direction;

(5) light entering the second birefringent wedge as an e-ray in the reverse principal direction exits from the first birefringent wedge as an e-ray in the reverse principal direction; and (6) light entering the second birefringent wedge as an o-ray in the reverse principal direction exits from the first birefringent wedge as an o-ray in the reverse principal direction.

FIGS. 2a and 2b illustrate the first function in detail. FIGS. 2a and 2c illustrate the second function in detail. FIGS. 3a and 3b illustrate the third function in detail. FIGS. 3a and 3c illustrate the fourth function in detail. FIGS. 4a and 4b illustrate the fifth function in detail. FIGS. 4a and 4c illustrate the sixth function in detail.

As shown in FIGS. 2a and 2b, light 220(e) traveling in the principal direction (i.e., the positive z-direction) enters birefringent wedge 15 as an e-ray with the x polarization. Light 220(e) is refracted at surface 11. After passing through Faraday rotator 16, the polarization of light 220(e) is rotated positive 45 degrees with respect to the positive z-axis, and light 220(e) becomes light 221(o) with the x+y polarization. Light 221(o) is refracted again at surface 12 and enters birefringent wedge 17 as an o-ray. Light 221(o) exits from birefringent wedge 17 traveling generally in the first output direction (i.e., the z+γy direction).

As shown in FIGS. 2a and 2c, light 210(o) traveling in the principal direction (i.e., the positive z-direction) enters birefringent wedge 15 as an o-ray with the y polarization. Light 210(o) is refracted at surface 11. After passing through Faraday rotator 16, the polarization of light 210(o) is rotated positive 45 degrees with respect to the positive z-axis, and light 210(o) becomes light 211(e) with the x−y polarization. Light 211(e) is refracted again at surface 12 and enters birefringent wedge 17 as an e-ray. Light 211(e) exits from birefringent wedge 17 traveling generally in the second output direction (i.e., the z−δy direction).

As shown in FIGS. 3a and 3b, light 320(e) traveling in the first input direction (i.e., the z−αy direction) enters birefringent wedge 15 as an e-ray with the x polarization. Light 320(e) is refracted at surface 11. After passing through Faraday rotator 16, the polarization of light 320(e) is rotated 45 positive degrees with respect to the positive z-axis, and light 320(e) becomes light 321(o) with the x+y polarization. Light 321(o) is refracted again at surface 12 and enters birefringent wedge 17 as an o-ray. Light 321(o) exits from birefringent wedge 17 traveling in the principal direction (i.e., the positive z-direction).

As shown in FIGS. 3a and 3c, light 310(o) traveling in the second input direction (i.e., the z+βy direction) enters birefringent wedge 15 as an o-ray with the y polarization. Light 310(o) is refracted at surface 11. After passing through Faraday rotator 16, the polarization of light 310(o) is rotated positive 45 degrees with respect to the positive z-axis, and light 310(o) becomes light 311(e) with the x−y polarization. Light 311(e) is refracted again at surface 12 and enters birefringent wedge 17 as an e-ray. Light 311(e) exits from birefringent wedge 17 traveling in the principal direction (i.e., the positive z-direction).

As shown in FIGS. 4a and 4b, light 420(e) traveling in the reverse principal direction (i.e., the negative z-direction) enters birefringent wedge 17 as an e-ray with the x−y polarization. Light 420(e) is refracted at surface 12. After passing through Faraday rotator 16, the polarization of light 420(e) is rotated positive 45 degrees with respect to the positive z-axis, and light 420(e) becomes light 421(e) with the x polarization. Light 421(e) is refracted again at surface 11 and enters birefringent wedge 15 as an e-ray. Light 421(e) exits from birefringent wedge 15 traveling in the reverse principal direction (i.e., the negative z-direction).

As shown in FIGS. 4a and 4c, light 410(o) traveling in the reverse principal direction (i.e., the negative z-direction) enters birefringent wedge 17 as an o-ray with the x+y polarization. Light 410(o) is refracted at surface 12. After passing through Faraday rotator 16, the polarization of light 410(o) is rotated positive 45 degrees with respect to the positive z-axis, and light 410(o) becomes light 411(o) with the y polarization. Light 410(o) is refracted again at surface 11 and enters birefringent wedge 15 as an o-ray. Light 411(o) exits from birefringent wedge 15 traveling in the reverse principal direction (i.e., the negative z-direction).

Due to the differences in the refractive index between the o-ray and the e-ray, light 421(e) and 411(o) can exit from birefringent wedge 15 with different paths. However, when the paths of 421(e) and 411(o) are substantially parallel, light 421(e) and 411(o) can be coupled to an optical fiber using a collimator.

In the implementation of non-reciprocal combination-device 10 shown in FIG. 1b, the optical axes of birefringent wedges 15 and 17 are, respectively, in the x direction and the x−y direction. Faraday rotator 16 is designed in such a way that the polarization of light passing through the Faraday rotator 16 will be rotated a positive 45 degrees with respect to the positive z-axis.

In another implementation of non-reciprocal combination-device 10, as shown FIG. 1c, the optical axes of birefringent wedges 15 and 17 are, respectively, in the x direction and the x+y direction. Faraday rotator 16 is designed in such a way that the polarization of light passing through the Faraday rotator 16 will be rotated a negative 45 degrees with respect to the positive z-axis.

In a third implementation of non-reciprocal combination-device 10, as shown in FIG. 1d, the optical axes of birefringent wedges 15 and 17 are, respectively, in the y direction and the x+y direction. Faraday rotator 16 is designed in such a way that the polarization of light passing through the Faraday rotator 16 will be rotated a positive 45 degrees with respect to the positive z-axis.

In a fourth implementation of non-reciprocal combination-device 10, as shown in FIG. 1e, the optical axes of birefringent wedges 15 and 17 are, respectively, in the $\cos(\phi)$ x+sin($\phi$) y direction and the $\cos(\phi-45)$x+sin($\phi-45$)y direction. Faraday rotator 16 is designed in such a way that the polarization of light passing through the Faraday rotator 16 will be rotated positive 45 degrees with respect to the positive z-axis.

In the implementation of non-reciprocal combination-device 10, as shown in FIG. 1a, birefringent wedges 15 and 17 are essentially in contact with Faraday rotator 16. In other implementations, other optical media (including air) can be inserted between birefringent wedge and Faraday rotator 16, and between birefringent wedge 17 and Faraday rotator 16.

FIG. 5a illustrates an implementation of an optical depolarizer 500 that includes a non-reciprocal combination-device 10. Depolarizer 500 also includes a lens 540, a birefringent block 580, and a reflector 590. A single mode fiber 510 and a Polarization Maintenance ("PM") fiber 520 are coupled to lens 540. The positions of single mode fiber 510 and PM fiber 520 can be fixed with a capillary 530. The optical axis of birefringent block 580 can be in the y-direction. Birefringent block 580 includes surface 585 of facing wedge 17.

As shown in FIGS. 5a and 5b, light with the x-polarization exiting from PM fiber 520 is coupled to non-reciprocal combination-device 10 through lens 540, and enters non-reciprocal combination-device 10 in the first input direction (i.e., the z−αy direction) as e-ray 320(e). After passing through non-reciprocal combination-device 10, e-ray 320(e) becomes o-ray 321(o) traveling in the principal direction (i.e., the positive z-direction) with the x+y polarization. O-ray 321(o) enters surface 585 of birefringent block 580 as light 381.

Light 381 can be decomposed as light 381(x) with the x-polarization and 381(y) with the y-polarization. Because the optical axis of birefringent block 580 is in the y-direction, light 381(x) and 381(y) are, respectively, the o-ray and the e-ray in birefringent block 580. Light 381(x) travels in the positive z-direction with the phase velocity of an o-ray. Light 381(y) travels in the positive z-direction with the phase velocity of an e-ray. Light 381(x) and 381(y) are reflected by reflector 590, and become, respectively, light 382(x) and 382(y). Light 381(x) travels in the negative z-direction with the phase velocity of an o-ray. Light 381(y) travels in the negative z-direction with the phase velocity of an e-ray. Light 382(x) and 382(y) are recombined at surface 585 as light 382.

When light 381 traveling in the positive z-direction enters surface 585, the phase difference between the decomposed light 381(x) and 381(y) is zero. The polarization of light 381 is x+exp(j$\theta_i$)y, with $\theta_i$=0. When light 382(x) and 382(y) are recombined at surface 585 as light 382 traveling in the negative z-direction, the phase difference between the decomposed light 382(x) and 382(y) is $\theta_f$. Phase difference $\theta_f$ is given by $\theta_f$=4π($n_e$−$n_o$) L/λ, where L is the length of the birefringent block 580, λ is the wavelength of light 382 (and light 381), $n_e$ and $n_o$ are respectively the refractive indexes of the e-ray and the o-ray. The polarization of light 382 is x+exp(j$\theta_f$)y.

For a selected wavelength $\lambda_1$, the phase difference $\theta_f$ can be zero, and the polarization of light 382 can be in the x+y direction. For another selected wavelength $\lambda_2$, the phase difference $\theta_f$ can be equal to π, and the polarization of light 382 can be in the x−y direction. For a third selected wavelength $\lambda_3$, the phase difference $\theta_f$ can be equal to π/2, and the polarization of light 382 can be in the x+j y direction (i.e., light 382 is circularly polarized).

When light 382 enters non-reciprocal combination-device 10 with the x+exp (j$\theta_f$)y polarization, light 382 can be decomposed as light 420(e) with the x−y polarization and light 410(o) with the x+y polarization and given by equation $$[x+\exp(j\theta_f)y]/2^{1/2}=[\cos(\theta_f/2)o-j\sin(\theta_f/2)e]\exp(j\theta_f/2),$$

where o=[x+y]/$2^{1/2}$ and e=[x−y]/$2^{1/2}$. The intensity of light 410(o) is proportional to $[\sin(\theta_f/2)]^2$. The intensity of light 410(o) is proportional to $[\cos(\theta_f/2)]^2$.

As shown in FIG. 5a and FIG. 5c, light 420(e) passes through non-reciprocal combination-device 10 as light 421 (e) with the x-polarization. Light 421(e) passes through lens 540, and enters single mode fiber 510 with the x-polarization.

As shown in FIG. 5a and FIG. 5d, light 410(o) passes through non-reciprocal combination-device 10 as light 411 (o) with the y-polarization. Light 411(o) passes through lens 540, and enters single mode fiber 510 with the y-polarization.

Therefore, light 320(e) with the x-polarization exiting from PM fiber 520 can be directed into single mode fiber 510 as light 511 that in general has both the x-polarization component and the y-polarization component. If light 320(e) has wavelength $\lambda_1$ and $\theta_f$=0, then, light 511 has mostly the y-polarization component. If light 320(e) has wavelength $\lambda_2$, and of $\theta_f$=π, then, light 511 has mostly the x-polarization component. If light 320(e) has wavelength between $\lambda_2$ and $\lambda_1$, then, light 511 in general has both the x-polarization component and the y-polarization component.

When light 320(e) has a certain bandwidth, with wavelengths ranging from $\lambda_2$ to $\lambda_1$, light 511 entering single mode fiber 510 can become depolarized.

FIG. 6a illustrates an implementation of an optical depolarizing combiner 600 that includes non-reciprocal combination-device 10. Depolarizing combiner 600 also includes a lens 540, a birefringent block 580, and a reflector 590. A single mode fiber 510, a first PM fiber 520, and a second PM fiber 520' are coupled to lens 540. The positions of single mode fiber 510, the first PM fiber 520, and the second PM fiber 520' can be fixed with a capillary 530. The optical axis of birefringent block 580 can be in the y-direction. Surface 585 of birefringent block 580 faces wedge 17.

FIG. 6a illustrates that light 320(e) with the x-polarization exiting from PM fiber 520 can be directed into single mode fiber 510 as light 511 that in general has both the x-polarization component and the y-polarization component.

FIG. 6a also illustrates that light 310(o) with the y-polarization exiting from PM fiber 520' can be directed into single mode fiber 510 as light 511' that in general has both the x-polarization component and the y-polarization component. FIGS. 6b–6d show in detail the processing of light 310(o).

As shown FIGS. 6a and 6b, light 310(o) with the y-polarization exiting from PM fiber 520' is coupled to non-reciprocal combination-device 10 through lens 540. Light 310(o) enters non-reciprocal combination-device 10 in the second input direction (i.e., the z+βy direction) as an o-ray. After passing through non-reciprocal combination-device 10, o-ray 310(o) becomes e-ray 311(e) in the principal direction (i.e., the positive z-direction) with the x−y polarization. E-ray 311(e) enters surface 585 of birefringent block 580 as light 381'.

Light 381' can be decomposed as light 381'(x) with the x-polarization and 381'(y) with the y-polarization. Light 381'(x) and 381'(y) travels in the positive z-direction with the phase velocity of the o-ray and the e-ray respectively. Light 381'(x) and 381'(y) are reflected by reflector 590, and become, respectively, Light 382'(x) and 382'(y). Light 382' (x) and 382'(y) travel in the negative z-direction with the phase velocity of the o-ray and the e-ray respectively. Light 382'(x) and 382'(y) are recombined at surface 585 as light 382'.

As shown FIG. 6c and FIG. 6d, light 382' entering non-reciprocal combination-device 10 can be decomposed as light 410'(o) with x+y polarization and as light ray 420'(e) with x−y polarization. Light 410'(o) and 420'(e) exit from non-reciprocal combination-device 10, respectively, as light 411'(o) with the y-polarization and as light 421'(e) with the x-polarization. Light 411'(o) and 421'(e) are combined and enter polarization single mode fiber 510 as light 511'. Light 511' in general has both the x-polarization component and the y-polarization component.

When light 310(o) has a certain bandwidth, with wavelengths ranging from $\lambda_2$ to $\lambda_1$, light 511' entering single mode fiber 510 can become depolarized.

FIG. 6a illustrates that optical depolarizing combiner 600 functions as both a depolarizer and a combiner. Light exiting from PM fiber 520 with the x-polarization and light exiting from PM fiber 520' with the y-polarization are directed into single mode fiber 510, and combined as depolarized light.

FIG. 7a illustrates that optical depolarizing combiner 600 can also function as an optical isolator. Light exiting from single mode fiber 510 can be decomposed as light 220(e) with the x-polarization and light 210(o) with the y-polarization.

As shown in FIG. 7b, light 220(e) passes through non-reciprocal combination-device 10 as light 221(o) traveling in the first output direction (i.e., the z+γy direction) with the x+y polarization. Light 221(o) travels though birefringent block 580 and is deflected by reflector 590. After deflected by reflector 590, light 221(o) does not travel back to single mode fiber 510, first PM fiber 520, or second PM fiber 520'.

As shown in FIG. 7c, light 210(o) passes through non-reciprocal combination-device 10 as light 211(e) traveling in the second output direction (i.e., the z−δy direction) with the x−y polarization. Light 211(e) travels though birefringent block 580 and is deflected by reflector 590. After being deflected by reflector 590, light 211(e) does not travel back to single mode fiber 510, first PM fiber 520, or second PM fiber 520'.

FIGS. 8a and 8b illustrate an implementation of an optical combiner 800 that includes non-reciprocal combination-device 10. Optical combiner 800 also includes a lens 540, and a reflector 590. A single mode fiber 510, a first PM fiber 520, and a second PM fiber 520' are coupled to lens 540. The positions of single mode fiber 510, first PM fiber 520, and second PM fiber 520' can be fixed with a capillary 530.

FIG. 8a illustrates that light 320(e) with the x-polarization exiting from first PM fiber 520 and light 310(o) with the y-polarization exiting from second PM fiber 520' are coupled to non-reciprocal combination-device 10. Light 320(e) and light 310(o) pass through non-reciprocal combination-device 10 as light 321(o) and light 311(e) respectively. Light 321(o) and light 311(e) are reflected by reflector 590, and enter non-reciprocal combination-device 10 as light 410(o) and light 420(e) respectively. Light 410(o) and light 420(e) pass back through non-reciprocal combination-device 10 as light 411(o) and light 421(e) respectively. Light 411(o) and light 421(e) are directed into single mode fiber 510, and are combined.

FIG. 8b illustrates that light exiting from single mode fiber 510 can be decomposed as light 220(e) and 210(o). Light 220(e) passes through non-reciprocal combination-device 10 as light 221(o) traveling in the first output direction (i.e., z+γy). Light 210(o) passes through non-reciprocal combination-device 10 as light 211(e) traveling in the second output direction (i.e., z−δy). Light 221(o) and light 211(e) are deflected by reflector 590. After being deflected by reflector 590, light 211(e) and light 221(o) do not travel back to single mode fiber 510, first PM fiber 520, or second PM fiber 520'.

FIGS. 9a and 9b illustrate an implementation of a PM isolator 900 that includes non-reciprocal combination-device 10. PM isolator 900 also includes a lens 540, and a reflector 590. An output PM fiber 910, and an input PM fiber 920 are coupled to lens 540. The positions of output PM fiber 910, and input PM fiber 920 can be fixed with a capillary 530.

FIG. 9a illustrates that light 320(e) with the x-polarization exiting from input PM fiber 920 is coupled to non-reciprocal combination-device 10 as e-ray. Light 320(e) passes through non-reciprocal combination-device 10 as light 321(o). Light 321(o) is reflected by reflector 590, and enters non-reciprocal combination-device 10 as light 410(o). Light 410(o) pass back through non-reciprocal combination-device 10 as light 411(o) and is directed into output PM fiber 910.

FIG. 9b illustrates that light 210(o) exiting from input PM fiber 920 enters non-reciprocal combination-device 10 as o-ray. Light 210(o) passes through non-reciprocal combination-device as light 211(e) traveling in the second output direction (i.e., z−δy). Light 211(e) is deflected by reflector 590. After being deflected by reflector 590, light 211(e) does not travel back to output PM fiber 910 or input PM fiber 920.

In the implementation of FIGS. 9a and 9b, output PM fiber 910 and input PM fiber 920 are aligned in such a way that light exits from input PM fiber 920 as an e-ray and enters output PM fiber 910 from non-reciprocal combination-device 10 as an o-ray. In an alternative implementation, output PM fiber 910 and input PM fiber 920 can be aligned in such a way that light exits from input PM fiber 920 as an o-ray and enters output PM fiber 910 from non-reciprocal combination-device 10 as an e-ray.

The optical depolarizer of FIG. 5a–5d and the optical depolarizing combiner of FIGS. 6a–6e include birefringent block 580 with an optical axis in the y-direction that forms a 45 degree angle with the optical axis of birefringent wedge 17. In alternative implementations, other angles between the optical axis of birefringent block 580 and the optical axis of birefringent wedge 17 can be selected.

In the implementations of FIGS. 5a, 6a and 7a, reflector 590 can be a mirror. In alternative implementations, reflective materials can be coated at the end of birefringent block 580 to function as reflector 590.

In the implementations of FIGS. 8a and 9a, reflector 590 can be a mirror. In alternative implementations, reflective materials can be coated on surface 19 of birefringent wedge 17 to function as reflector 590.

Birefringent block 580, birefringent wedge 15, and birefringent wedge 17 can be constructed from birefringent crystal materials, such as, calcite, rutile, lithium niobate or yttrium orthvanadate.

A birefringent crystal material in general has refractive indexes $n_e$ for e-ray and $n_o$ for o-ray. Non-reciprocal combination-device 10 can be constructed using birefringent crystal materials with indexes $n_e$ larger than $n_o$, or birefringent crystal materials with indexes $n_e$ smaller than $n_o$.

FIGS. 10a and 10b illustrate implementations of non-reciprocal combination-device 10 including birefringent wedges 15 and 17 in the form of tapered plate. Surface 11 of birefringent wedge 15 substantially parallels surface 12 of birefringent wedge 17. The tapering angle of birefringent wedges 15 and 17 is χ.

FIG. 10a illustrates an implementation of non-reciprocal combination-device 10 constructed using birefringent crystal materials with indexes $n_e$ larger than $n_o$. FIG. 10a also illustrates the paths traveled by e-ray 320(e) and o-ray 310(o). E-ray 320(e) is incident upon surface 11 of birefringent wedge 15 in the $\cos(\theta_e)z-\sin(\theta_e)y$ direction and exits from birefringent wedge 17 in the positive z-direction. Here $\theta_e$ satisfies equation $n_e \sin(\chi-\theta_e)=n_o \sin(\chi)$. O-ray 310(o) is incident upon surface 11 of birefringent wedge 15 in the $\cos(\theta_o)z+\sin(\theta_o)y$ direction and exits from birefringent wedge 17 in the positive z-direction. Here $\theta_o$ satisfies equation $n_o \sin(\chi+\theta_o)=n_e \sin(\chi)$.

FIG. 10b illustrates an implementation of non-reciprocal combination-device 10 constructed using birefringent crystal materials with indexes $n_e$ smaller than $n_o$. FIG. 10b also illustrates the paths traveled by e-ray 320(e) and o-ray 310(o). E-ray 320(e) is incident upon surface 11 of birefringent wedge 15 in the $\cos(\theta_e)z-\sin(\theta_e)y$ direction and exits from birefringent wedge 17 in the positive z-direction. Here $\theta_e$ satisfies equation $n_e \sin(\chi+\theta_e)=n_o \sin(\chi)$. O-ray 310(*o*) is incident upon surface 11 of birefringent wedge 15 in the $\cos(\theta_o)z+\sin(\theta_o)y$ direction and exits from birefringent wedge 17 in the positive z-direction. Here $\theta_o$ satisfies equation $n_o \sin(\chi-\theta_o)=n_e \sin(\chi)$.

A method and system has been disclosed for providing optical depolarizers, optical depolarizing combiners, optical combiners, and PM isolators. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical depolarizer comprising:
   an optical device having a principal direction, a reverse principal direction and a first input direction, the device configured for enabling polarized light entering the device in the first input direction to exit in the first principal direction, and light entering the device in the reverse principal direction to exit in the reverse principal direction; and
   a block optically coupled to the device, the block configured for receiving light from the device and introducing a phase difference in orthogonal polarization states of the light.

2. The optical depolarizer of claim 1 further comprising a reflector optically coupled to the block and operable to reflect light received from the block back to the block.

3. The optical depolarizer of claim 2 further comprising a lens optically coupled to the device.

4. The optical depolarizer of claim 3 further comprising a capillary for holding at least a PM input optical fiber and an output optical fiber proximate to the lens such that,
   light exiting from the PM input optical fiber passes through the lens and enters the device in the first input direction with a first polarization, and
   light exiting from the device in the reverse principal direction passes through the lens and enters the output optical fiber.

5. The optical depolarizer of claim 3 further comprising a capillary for holding at least a first and a second PM input optical fiber, and an output optical fiber proximate to the lens such that,
   light exiting from the first PM input optical fiber passes through the lens and enters the device in the first input direction with a first polarization, and
   light exiting from the second PM input optical fiber passes through the lens and enters the device in a second input direction with a second polarization, and
   light exiting from the device in the reverse principal direction passes through the lens and enters the output optical fiber.

6. The optical polarizer of claim 1 wherein the optical device comprises:
   (a) a first birefringent wedge having a first optical axis perpendicular to the principal direction,
   (b) a second birefringent wedge having a second optical axis perpendicular to the principal direction, the second optical axis forming a first angle with respect to the first optical axis, and
   (c) a non-reciprocal rotating element optically coupled between the first and the second birefringent wedge and adapted to rotate a polarization of light passing therethrough by a second angle.

7. The optical depolarizer of claim 6 wherein the block comprises a birefringent block having a third optical axis perpendicular to the principal direction, the third optical axis forming a third angle with respect to the second optical axis.

8. The optical depolarizer of claim 7 wherein the third angle is 45 degrees.

9. The optical depolarizer of claim 6 wherein the non-reciprocal rotating element is a Faraday rotator.

10. An optical depolarizer comprising:
    a block of birefringent material having a birefringent block optical axis, the block adapted to receive light polarized along a direction that makes a 45 degree angle with the birefringent block optical axis;
    a reflector coupled to the block located on a first side of the block;
    an input port located on a second side of the block adapted to supply polarized light to the block; and
    an output port located on the second side of the block adapted to receive unpolarized light from the block.

11. An optical depolarizer comprising:
    a block of birefringent material having a birefringent block optical axis, the block adapted to receive light polarized along a direction that makes a non-zero angle with the birefringent block optical axis;
    a reflector coupled to the block located on a first side of the block;
    an input port located on a second side of the block adapted to supply polarized light to the block; and
    an output port located on the second side of the block adapted to receive unpolarized light from the block; and
    a non-reciprocal combination device coupled to the block.

12. The optical depolarizer of claim 11 wherein the non-reciprocal combination device has a principal direction, a reverse principal direction and a first input direction, and is configured for enabling polarized light entering the device in the first input direction to exit as rotated polarized light in the first principal direction, and light entering the device in the reverse principal direction to exit in the reverse principal direction.

13. The optical depolarizer of claim 12 wherein the non-reciprocal combination device comprises:
    (a) a first birefringent wedge having a first optical axis perpendicular to the principal direction,
    (b) a second birefringent wedge having a second optical axis perpendicular to the principal direction, the second optical axis forming a first angle with respect to the first optical axis, and
    (c) a non-reciprocal rotating element optically coupled between the first and the second birefringent wedge and adapted to rotate a polarization of light passing therethrough by a second angle.

14. The optical depolarizer of claim 13 wherein the second optical axis makes a 45 degree angle with the birefringent black optical axis.

15. The optical depolarizer of claim 13 wherein the non-reciprocal rotating element is a Faraday rotator.

* * * * *